United States Patent [19]

Skobel

[11] 3,713,627

[45] Jan. 30, 1973

[54] MULTIPLE COMPONENT METERING AND MIXING DEVICE

[75] Inventor: Max Skobel, Edison, N.J.

[73] Assignee: Dow Corning Corporation, Midland, Mich.

[22] Filed: Sept. 15, 1971

[21] Appl. No.: 180,595

[52] U.S. Cl. .................................. 259/6, 259/192
[51] Int. Cl. ............................................ B01f 7/08
[58] Field of Search ............ 259/5, 6, 192, 9, 10, 191, 259/21, 25, 26, 40, 45, 46

[56] References Cited

UNITED STATES PATENTS

| | | |
|---|---|---|
| 3,392,962 | 7/1968 | Fritsch ..................................... 259/9 |
| 3,591,145 | 7/1971 | Ainsworth ............................... 259/6 |
| 3,667,733 | 6/1972 | Fritsch ..................................... 259/6 |

*Primary Examiner*—Robert W. Jenkins
*Attorney*—Robert F. Fleming, Jr. et al.

[57] ABSTRACT

A two component mixing device is fed by a pair of conveyor screws feeding and metering the two components from containers containing same. The outputs of the conveyor screws are fed into a mixing screw of varying depth which in turn feeds a nozzle suitable, for example, for feeding a mold. All screws can be powered by a single source.

16 Claims, 7 Drawing Figures

INVENTOR.
Max Skobel
BY
Howard W. Hermann
ATTORNEY

INVENTOR.
Max Skobel

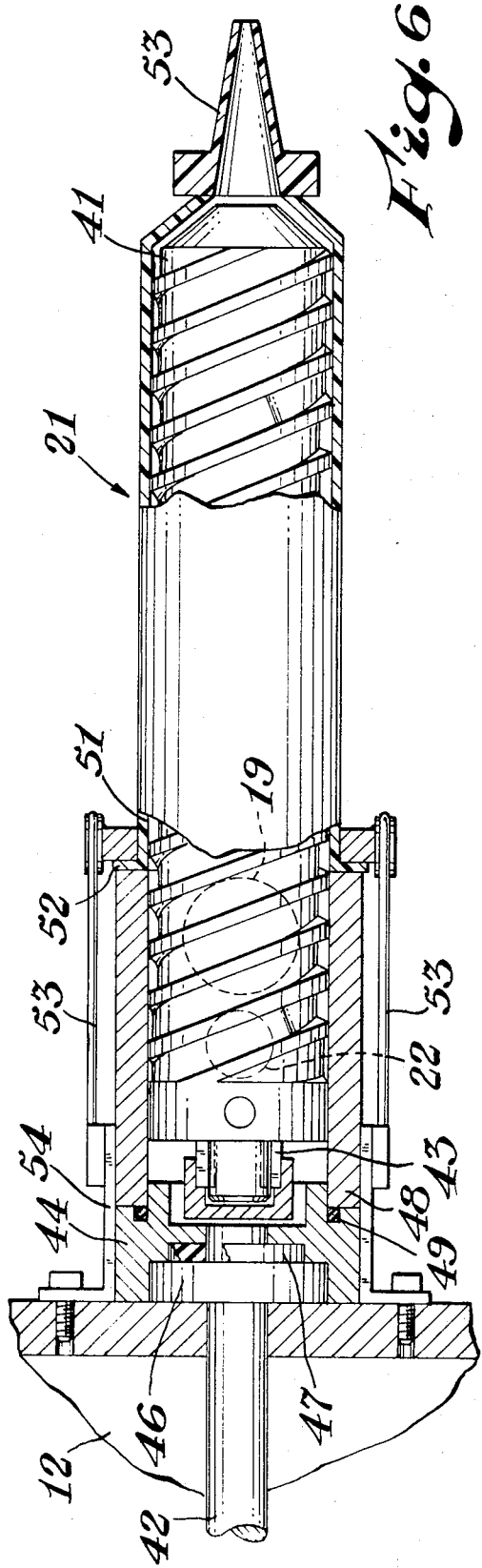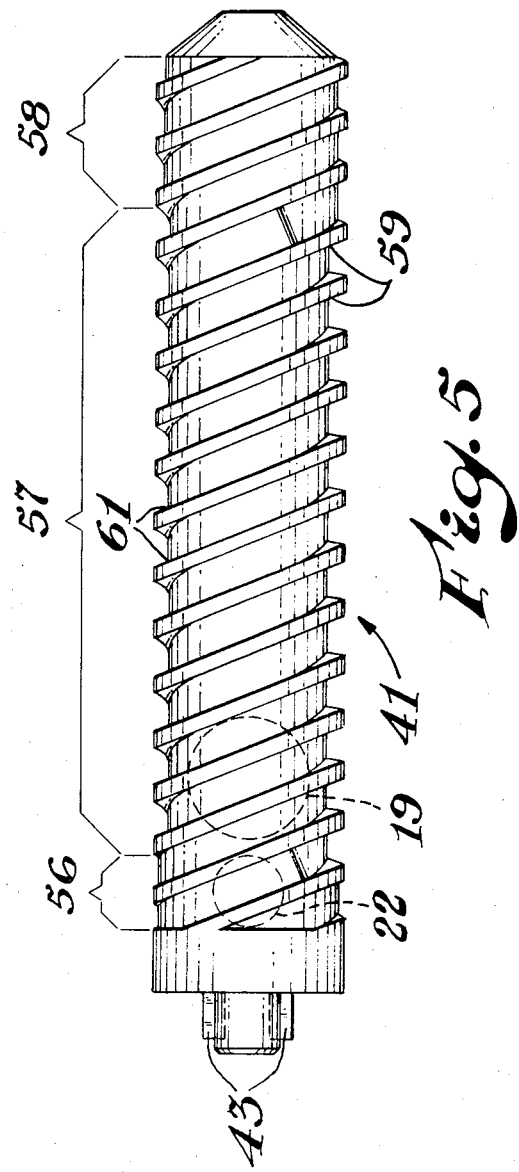

MULTIPLE COMPONENT METERING AND MIXING DEVICE

BACKGROUND OF THE INVENTION

This invention relates to the admixing of multiple components of plastics and the like and more particularly relates to the conveying of the components from shipping containers in metered amounts and admixing in desired proportions.

It is well known that in many types of plastics and synthetic rubbers various components of the materials are packaged separately. This may be for reasons of shelf-life, the fact that one of the components is a curing catalyst or agent for the other component, the fact that the user may want to vary components, or numerous other reasons. In any case the components must ultimately be mixed in predetermined proportions before use. Generally, predetermined volumes or weights of the components are mixed together in a batch process. That is, the two components are dumped into a container and mixing is carried out in the container before use. Particularly in the case where one of the components is a curing agent for the other component, the mixture has a limited pot life before curing occurs and with some materials the properties of the materials change quite rapidly with time. In molding operations or extruding operations, the flow properties of the material can be quite critical in obtaining desired results since the die shapes and mold shapes cannot be changed during operations to compensate for differences in viscosity and other factors. This problem is particularly critical in liquid molding operations. This necessitates frequent mixing of small batches in order to achieve desired results and results in substantial waste of material if the batch quantities do not exactly equal the amount of material needed for the molding or extruding operation. Additionally, substantial labor is involved in cleanup. While there have been proposed other systems for automatically metering mixing components, none to applicant's knowledge have been completely satisfactory.

SUMMARY OF THE INVENTION

It is, therefore, an object of the present invention to provide a system for continuously automatically conveying, metering and mixing multiple components on an as-needed basis with a minimum of waste. A further object is the elimination insofar as possible of labor connected with the mixing of plastics and synthetic rubbers in the fabrication of finished parts made of these materials. In accordance with the present invention, these and other objects are accomplished by a system which utilizes screws for conveying the components from their containers in metered amounts to a mixing screw in which the components are thoroughly mixed on an as-needed basis. The system is adaptable for handling materials of virtually any viscosity and admixing in virtually any proportions. It may be started and stopped at any time with only a minimum of material wasted and a minimum of labor required in cleaning. Cleaning is also accomplished without use of solvents thereby eliminating prior art problems with solvent disposal.

BRIEF DESCRIPTION OF THE DRAWINGS

Other objects and attendant advantages of the present invention will become obvious to those skilled in the art from a reading of the following detailed description when read in conjunction with the accompanying drawings wherein:

FIG. 5 is a view in elevation of the mixer screw of the embodiment shown in FIG. 1; and FIG. 6 is a fragmentary partial cross-sectional view of the mixer assembly of the embodiment shown in FIG. 1 to illustrate further detail thereof.

DESCRIPTION OF THE PREFERRED EMBODIMENTS

Figure 1:
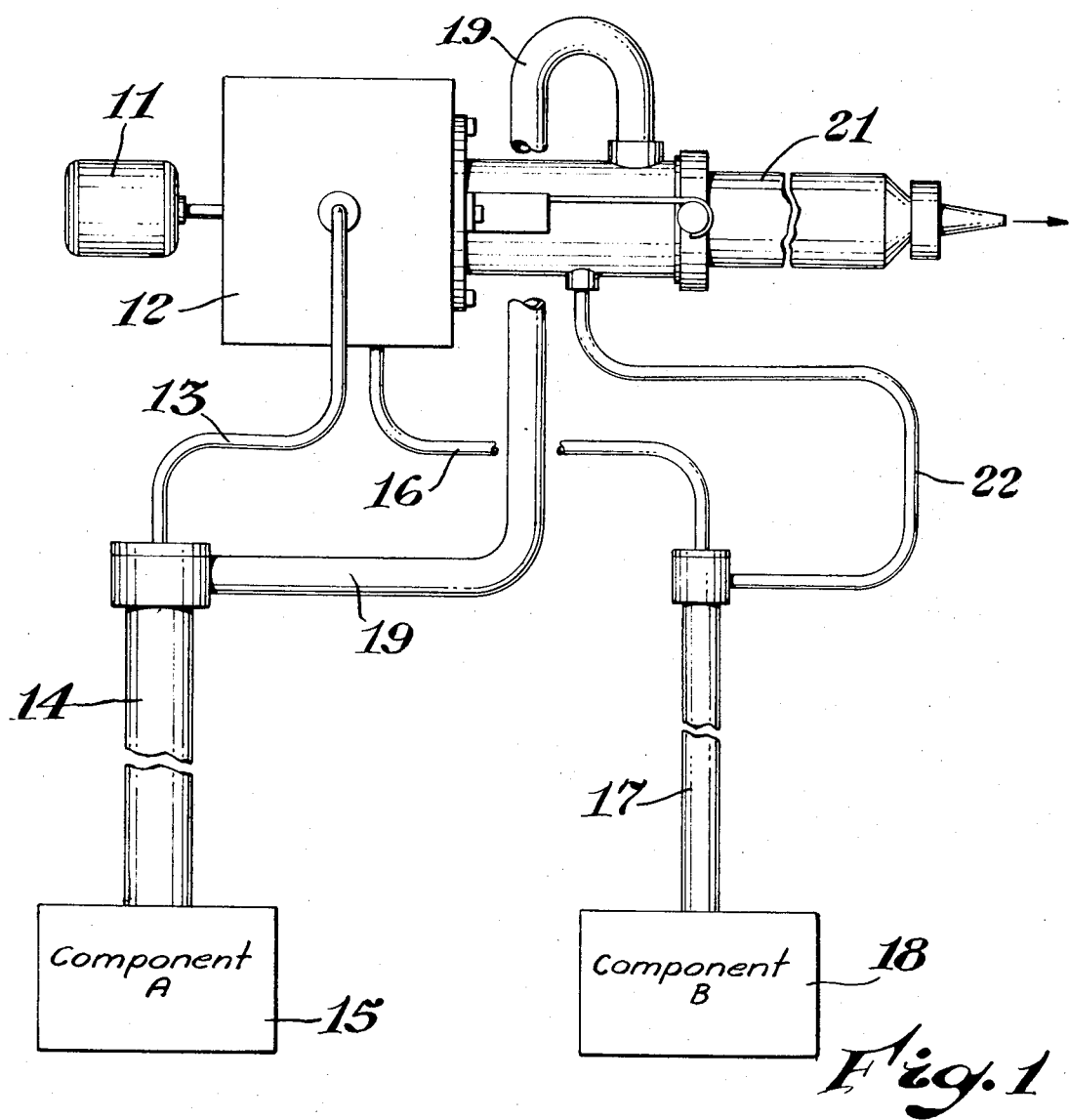
FIG. 1 is a diagrammatic view in elevation of an embodiment of the present invention.

Referring now to the drawings wherein like reference characters designate like or corresponding parts throughout the figures thereof, there is shown in FIG. 1 a somewhat diagrammatic drawing of an embodiment of the invention. A motor 11, which acts as power supply means for the system, supplies power to a gear box 12 having three output shafts. A first output shaft 13 which is preferably a flexible shaft drives a first component conveyor 14 vertically positioned in a container 15 which may be the original shipping container of component A. A second flexible shaft 16 from the gear box 12 drives a second conveyor 17 positioned in a second container 18 which again may be the original shipping container for the second component of the material to be mixed. For example, component A in container 15 may be a silicone rubber base stock and component B in container 18 may be the curing agent for the silicone rubber base stock.

The conveyor 14 removes material from the container 15 in metered amounts and transfers it via a conduit means 19, which may, for example, be a reinforced rubber hose, to the input of a mixer 21. Similarly, the output of the conveyor 17 is transferred to the mixer 21 by means of a conduit 22.

Figure 2:
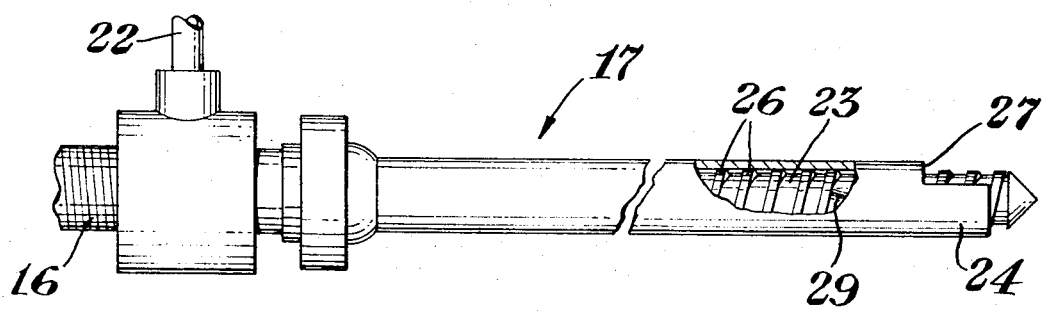
FIG. 2 is a fragmentary sideview in elevation of one of the conveyor screw assemblies shown in the embodiment of FIG. 1.

As may be seen more clearly from FIG. 2 the conveyor 17 comprises a screw 23 which is driven by the flexible shaft 13 from the gear box 12. The screw 23 is closely confined within a cylindrical tube 24 which has substantially the same internal diameter as the external flight diameter of the screw so that a close fit is maintained between the screw and the tube. The close fit ensures that material once picked up by the screw and conveyed by the screw flight 26 into the tube 24 will no longer leak around the periphery of the flights even though the material is being conveyed vertically and may be a very low viscosity liquid. The tube 24 may be made of a material having a relatively low coefficient of friction such as, for example, nylon.

Figure 2A:
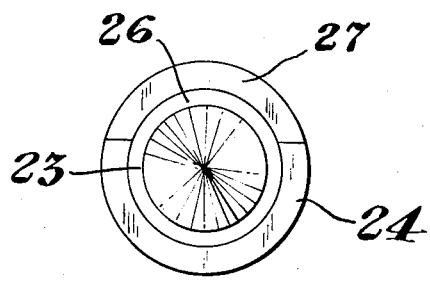
FIG. 2A is an endview in elevation of the assembly shown in FIG. 2.

In order to allow the screw 23 to pick up material in amounts such that the spaces defined by the flights 26 of the screw remain full, a slot 27 (FIG. 2A) is provided in the cylindrical wall of the input end of the tube 24. The slot 27 is cut axially in the input end of the tube and extends for at least the axial space between two adjacent flights. Aditionally, as may be seen more clearly from FIG. 3, the depth of the flight in the input section 28 is deeper than that of the remainder of the screw so that sufficient material enters the screw so that a slight excess of material is transmitted as far as the shoulder 29 where transition occurs. By ensuring that the space between flights is filled through a substantial part of the tube, the amount of material being conveyed by the screw can be accurately determined as a function of axial cross-sectional area between adjacent flights, screw pitch, and screw speed. By having the first section 28 of the screw larger in volume than the portion after the shoulder 29, complete filling of the remainder of the screw is ensured.

Figure 4:
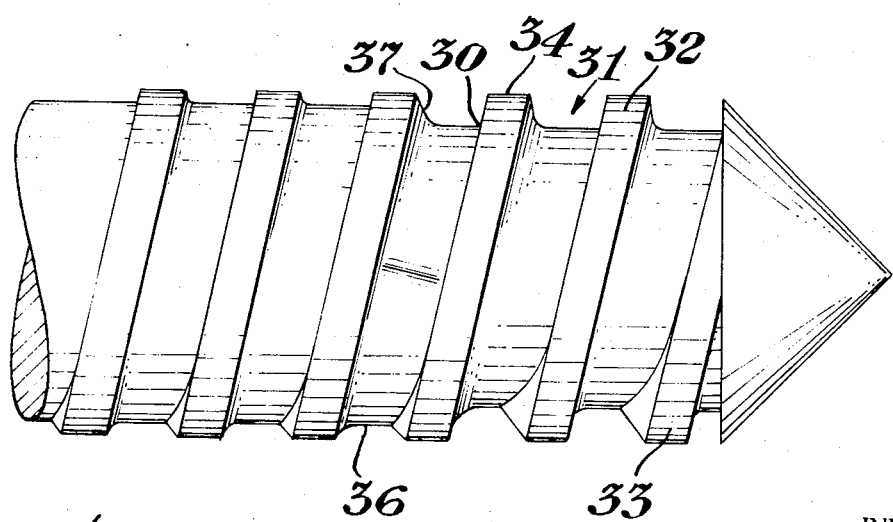
FIG. 4 is a fragmentary sideview in elevation showing details of the major component conveyor screw shown in FIG. 1.

FIG. 4 is a fragmentary view of the screw used in the conveyor 14 for component A. The screw 31 is mounted within a cylindrical tube in the same manner as the screw 23 which has been described in detail above. The screw 31, however, is designed to supply a larger quantity of material than the screw 23 which was described above. This is accomplished by providing multiple flights 32, 33 and 34 spaced 120 degrees apart around the circumference of the screw. This gives a greater angle on each flight thereby conveying material faster.

Figure 3:
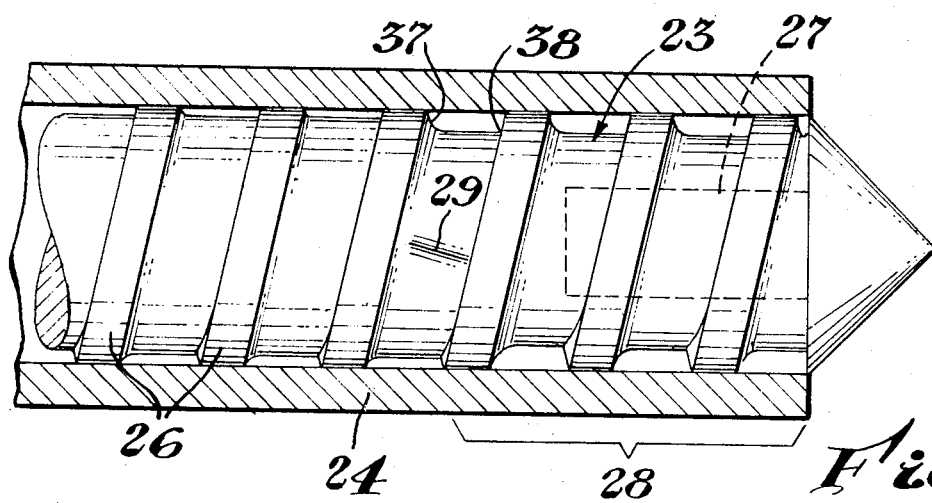
FIG. 3 is a fragmentary sideview in elevation showing more detail of the minor component conveyor screw shown in FIG. 1.

A factor to be noted in FIGS. 3 and 4 which is important to the performance of the conveyor screws 23 and 31 is the fact that the base transition at the leading edge of each flight of each of the conveyor screws is at a substantially greater radius than the base transition 38 at the trailing edge of each flight of each of the conveyor screws. The sharp transition 38 at the trailing edge tends to cause material to flow in between the flights and remain there but once the compression point at the shoulder 29 is reached the large radius at the leading edge of each flight tends to cause material to flow radially outward creating compression of the material against the confining tube 24, thus further assuring filling of the space between adjacent flights.

Component A arriving through conduit 19 and component B arriving through conduit 22 which are shown in phantom lines in FIG. 6 are fed to the input end of a mixing device shown generally by the numerals 21 and which comprises a screw 41. As shown in FIG. 6 the screw 41 is driven by means of a shaft 42 from the gear box 12 which is coupled to the screw by means such as keys 43. In the preferred embodiment the mixing device 21 is mounted directly on the gear box by means of a housing 44 containing shaft bearings 46 and a seal 47 to prevent leakage between mixer and gear box. A collar 48 extends from the housing 44 and is provided with inlet connections for the input end of the mixer screw 41 corresponding to the conduits 19 and 22, which are shown in phantom lines in both FIGS. 5 and 6. Desirably an O-ring seal 49 is also provided between the housing and collar to prevent leakage.

The output end and major portion of the mixing section of the screw 41 is confined in a cylindrical tube 51 having a flange 52 at its innermost end and a nozzle 53 or other suitable output means at its output end. The nozzle 53 is designed to fit the input port of an injection molding machine. Obviously, if desired, other types of output devices could be affixed to the tube 51. The inner diameter of the tube 51 is substantially equal to external flight diameter of the screw to prevent slippage of material around the flights of the screw as the screw turns within the tube. The flange 52 is clamped to the outermost end of the collar 48 by easily detachable means such as springs 53 connected to brackets 54 bolted to the housing or the gear box 12. The spring clamps 53 provide for quick detachment of the tube 51 and removal of the screw for easy cleaning.

The screw 41 as may be seen more clearly from FIG. 5 is divided into three main sections: A first component input section 56 which has a relatively shallow flight depth, a second component input and mixing section 57 which has a substantially greater flight depth than the first component input section 56; and an output compression section 58 which has a shallower flight depth from that of the mixing section 57. Assuming that the pitch of the screw flights is constant throughout its length, the cross-sectional area axially of the screw between adjacent flights serves to limit the amount of material which can be conveyed by the screw from one end to the other.

By providing a shallow first component input section 56 corresponding in cross-section to the proportion of the first component which is desired in the final product and providing an abrupt transition between the sections 56 and 57, it is assured that no backflow of the second component arriving from the input conduit 19 flows back into the first component conduit line. If this were to happen in the case where the first component were a curing agent for the second component it would be possible to cause cured material to set up in the first component conduit thereby blocking the system.

The flights in the mixing section 57 are designed to provide maximum turbulence of material as it is moved through the device. To this end the base transition at the leading edge of each flight 59 of the mixing screw is at substantially greater radius than the base transition 61 at the trailing edge of each flight of the mixing screw. Thus the screw flights tend to convey the material toward the output end with a minimum of back flow but as material is pushed forward the curvature at the trailing end of the next flight tends to create lateral flow in the material. The curved trailing end, of course, also gives pressure on the outside wall of the mixer thereby increasing the efficiency of the screw. The shoulder between the mixing section 57 and the compression section 58 also adds in turbulence while the compression section prevents any vacuum build-up in the event of screw overspeed and also generates some heat in the material prior to output from the nozzle, thereby cutting mold curing time in the material.

In operation, one can choose the gear ratios required for the particular combination of components to be mixed. The system is designed so that speed versus output of the screws is substantially linear on the feed screws. Obviously, in place of changing gearing it is possible to use variable speed motors to vary the component composition. Gearing may also be provided between the flexible shafts and the conveyor screws if desired. Such steps are all within the skill of those versed in the art and need not be described herein in detail. It is also possible to provide conveyor screws and/or mixing screws with other pitches to control component proportions rather than changing gearing.

It is to be understood that the embodiment shown is a preferred embodiment for illustrative purposes and that other modifications and variations of the invention will become obvious to those skilled in the art from a reading of the foregoing specification. Therefore, it is to be understood that within the scope of the claims the invention may be practiced otherwise than as described.

That which is claimed is:

1. A device for mixing multiple components in predetermined proportions, comprising:

First and second conveyor screws confined in a cylindrical tube having substantially the same internal diameter as the external flight diameter of the screw, said tubes each having an input opening in the cylindrical wall thereof adjacent the input end of the screw, said screws and tubes being positionable in a pair of containers each containing one of two components to be mixed together;

a mixing screw having a first component input section and a mixing section, said first component input section having an axial cross-sectional area of the space between axially adjacent flights which is substantially less than the axial cross-sectional area of the space between axially adjacent flights in the mixing section of the screw, said mixing screw being confined in a cylindrical tube having substantially the same internal diameter as the external flight diameter of the screw and having axially spaced openings therethrough near the input end of said screw, one of said openings being adjacent said first component input section and the other adjacent the feed end of the mixing section of the mixing screw;

conduit means interconnecting each of the outputs of said conveyor screws to one of said openings adjacent the mixing screw; and means for driving all three of said screws at predetermined speeds relative to each other.

2. A device as defined in claim 1 wherein the depth of the screw flights in said first component input section of the mixing screw is less than the depth of the screw flights in the mixing section of the mixing screw.

3. A device as defined in claim 2 wherein the base transition at the leading edge of each flight of the mixing screw is at a substantially greater radius than the base transition at the trailing edge of each flight of the mixing screw.

4. A device as claimed in claim 3 wherein said mixing screw has a plurality of helical flights.

5. A device as claimed in claim 4 wherein said mixing screw further comprises a compression section adjacent its output end, the cross-sectional area of the space between axially adjacent flights in said compression section being smaller than the cross-sectional area of the space between axially adjacent flights in said mixing section.

6. A device as defined in claim 5 wherein said openings in the cylindrical walls of the tubes confining the first and second conveyor screws are slots cut axially in the input ends of the tubes which extend for at least the axial space between two adjacent flights.

7. A device as defined in claim 6 wherein the depth of the flights of the first and second conveyor screws in the section of each screw adjacent the input openings are substantially deeper than the flights in the section of the screw adjacent the output end of each screw.

8. A device as defined in claim 7 wherein the base transition at the leading edge of each flight of each of the conveyor screws is at a substantially greater radius than the base transition at the trailing edge of each flight of each of the conveyor screws.

9. A device as defined in claim 2 wherein said mixing screw further comprises a compression section adjacent its output end, the cross-sectional area of the space between axially adjacent flights in said compression section being smaller than the cross-sectional area of the space between axially adjacent flights in said mixing section.

10. A device as defined in claim 9 wherein said openings in the cylindrical walls of the tubes confining the first and second conveyor screws are slots cut axially in the input ends of the tubes which extend for at least the axial space between two adjacent flights.

11. A device as defined in claim 10 wherein the depth of the flights of the first and second conveyor screws in the section of each screw adjacent the input openings are substantially deeper than the flights in the section of the screw adjacent the output end of each screw.

12. A device as defined in claim 11 wherein the base transition at the leading edge of each flight of each of the conveyor screws is at a substantially greater radius than the base transition at the trailing edge of each flight of each of the conveyor screws.

13. A device as defined in claim 12 wherein the base transition at the leading edge of each flight of the mixing screw is at a substantially greater radius than the base transition at the trailing edge of each flight of the mixing screw.

14. A device as defined in claim 2 wherein the base transition at the leading edge of each flight of each of the conveyor screws is at a substantially greater radius than the base transition at the trailing edge of each flight of each of the conveyor screws.

15. A device as defined in claim 14 wherein the base transition at the leading edge of each flight of each of the conveyor screws is at a substantially greater radius than the base transition at the trailing edge of each flight of each of the conveyor screws.

16. A device as defined in claim 15 wherein said openings in the cylindrical walls of the tubes confining the first and second conveyor screws are slots cut axially in the input ends of the tubes which extend for at least the axial space between two adjacent flights.

* * * * *